United States Patent
Park et al.

(10) Patent No.: US 12,473,469 B2
(45) Date of Patent: Nov. 18, 2025

(54) FOLDABLE ADHESIVE FILM AND FABRICATION METHOD THEREFOR

(71) Applicant: LG CHEM, LTD., Seoul (KR)

(72) Inventors: Hyon Gyu Park, Daejeon (KR); Hyun Cheol Kim, Daejeon (KR); Hee Song, Daejeon (KR); Seung Yeon Ryu, Daejeon (KR)

(73) Assignee: XINMEI FONTANA HOLDING (HONG KONG) LIMITED, Hong Kong (CN)

( * ) Notice: Subject to any disclaimer, the term of this patent is extended or adjusted under 35 U.S.C. 154(b) by 356 days.

(21) Appl. No.: 17/634,281

(22) PCT Filed: Dec. 3, 2020

(86) PCT No.: PCT/KR2020/017545
§ 371 (c)(1),
(2) Date: Feb. 10, 2022

(87) PCT Pub. No.: WO2021/112588
PCT Pub. Date: Jun. 10, 2021

(65) Prior Publication Data
US 2022/0332988 A1    Oct. 20, 2022

(30) Foreign Application Priority Data

Dec. 3, 2019    (KR) .......... 10-2019-0158956
Dec. 3, 2019    (KR) .......... 10-2019-0158957

(51) Int. Cl.
| | | |
|---|---|---|
| *C09J 7/10* | (2018.01) | |
| *C08F 220/18* | (2006.01) | |
| *C09J 11/08* | (2006.01) | |
| *C09J 133/10* | (2006.01) | |

(52) U.S. Cl.
CPC ....... *C09J 133/10* (2013.01); *C08F 220/1808* (2020.02); *C09J 7/10* (2018.01); *C09J 11/08* (2013.01); *C09J 2301/312* (2020.08); *Y10T 428/2891* (2015.01)

(58) Field of Classification Search
None
See application file for complete search history.

(56) References Cited

U.S. PATENT DOCUMENTS

| | | | |
|---|---|---|---|
| 2009/0291300 A1* | 11/2009 | Etoh ................ | H05K 3/386 |
| | | | 428/355 AC |
| 2015/0344747 A1* | 12/2015 | Park ................ | B32B 27/30 |
| | | | 428/41.5 |
| 2019/0203077 A1* | 7/2019 | Park ................ | C09J 7/00 |
| 2019/0203078 A1* | 7/2019 | Park ................ | C09J 11/06 |
| 2022/0117866 A1* | 4/2022 | Meehan .......... | A61Q 13/00 |
| 2022/0228042 A1* | 7/2022 | Song ............... | C09J 133/06 |

FOREIGN PATENT DOCUMENTS

| | | |
|---|---|---|
| CN | 101484545 A | 7/2009 |
| CN | 103173141 A | 6/2013 |
| JP | 2004-067958 A | 3/2004 |
| KR | 10-2009-0033423 A | 4/2009 |
| KR | 10-2017-0070753 A | 6/2017 |
| KR | 10-2017-0090229 A | 8/2017 |
| KR | 10-2017-0120982 A | 11/2017 |
| KR | 10-2019-0029006 A | 3/2019 |
| KR | 10-2019-0036817 A | 4/2019 |
| KR | 10-2019-0069334 A | 6/2019 |
| KR | 10-2019-0085750 A | 7/2019 |
| WO | 2008-004650 A1 | 1/2008 |

OTHER PUBLICATIONS

Istvan, Benedek et al., "Pressure-Sensitive Adhesives Technology", Chapter 3, pp. 76-79 (Year: 1997).*
JIS Z0237 Adhesion Method, Livasta Label Materials Technical Information (Year: 2022).*
International Search Report issued for International Application No. PCT/KR2020/017545 on Apr. 5, 2021, 4 pages.

* cited by examiner

*Primary Examiner* — Anish P Desai
(74) *Attorney, Agent, or Firm* — Ricky Lam

(57) ABSTRACT

The present invention relates to a foldable adhesive film and a fabrication method therefor, and particularly, to a foldable adhesive film having improved folding performance by minimizing the deformation thereof at high temperature, maintaining the creep strain and recovery thereof at constant levels in a temperature range from low temperature to high temperature, minimizing the force that is applied for deformation of the adhesive film in a low-temperature region, improving the recovery thereof in a low-temperature region, and maintaining the recovery thereof at constant levels in a temperature range from a low-temperature region to a high-temperature region, and a fabrication method therefor.

9 Claims, 2 Drawing Sheets

[Fig.1]
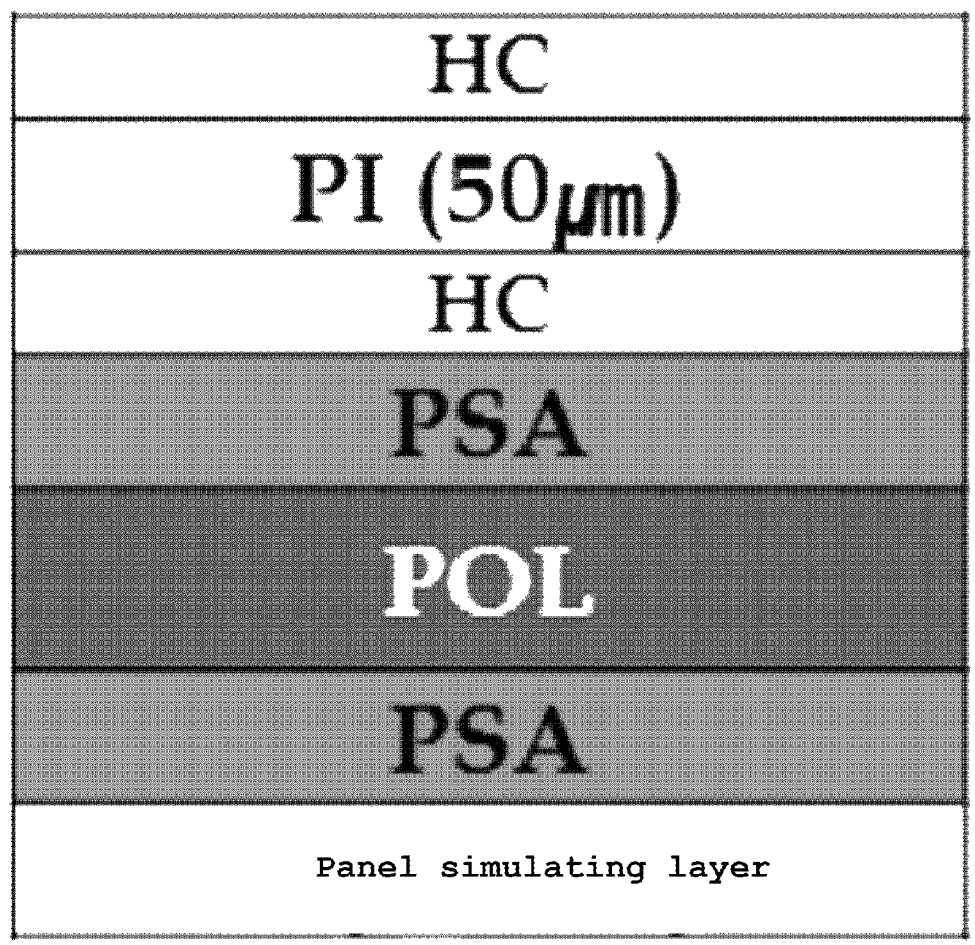

[Fig.2]
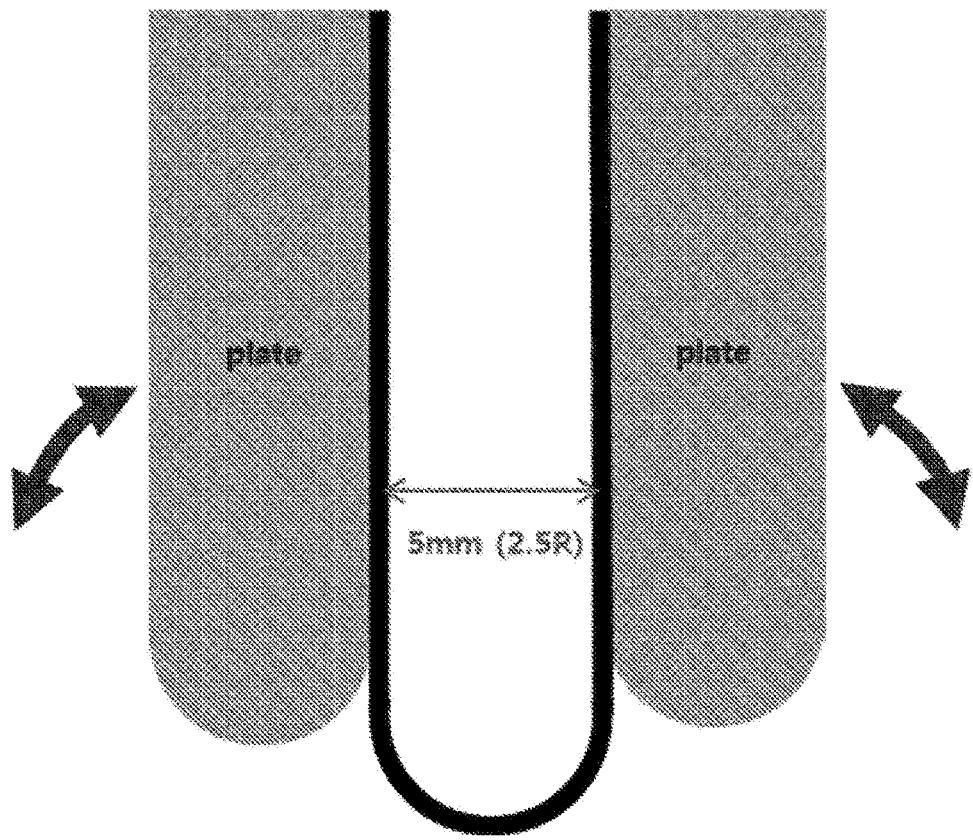

FOLDABLE ADHESIVE FILM AND FABRICATION METHOD THEREFOR

This application is a 35 U.S.C. 371 National Phase Entry Application from PCT/KR2020/017545, filed on Dec. 3, 2020, which claims the benefits of the filing dates of Korean Patent Application No. 10-2019-0158956, filed on Dec. 3, 2019, and of Korean Patent Application No. 10-2019-0158957, filed on Dec. 3, 2019, in the Korean Intellectual Property Office, the entire contents of which are incorporated by reference herein.

TECHNICAL FIELD

The present invention relates to a foldable adhesive film and a fabrication method therefor, and more particularly, to a foldable adhesive film having improved folding performance by minimizing the deformation thereof at high temperature, maintaining the creep strain and recovery thereof at constant levels in a temperature range from low temperature to high temperature, minimizing the force that is applied for deformation of the adhesive film in a low-temperature region, improving the recovery thereof in a low-temperature region, and maintaining the recovery thereof at constant levels in a temperature range from a low-temperature region to a high-temperature region, and a fabrication method therefor.

BACKGROUND OF THE INVENTION

An adhesive that is used in a foldable display requires sufficient deformation to relieve the stress between layers that occurs during folding, and is also required to have an excellent recovery property to recover to its original state.

Furthermore, a portable device to which a foldable display is applied is used in various areas ranging from extremely low-temperature areas to extremely high-temperature areas, and thus should have excellent folding performance over a wide temperature range. For this folding performance, an adhesive film that is applied to the foldable display is required to have a high strain and, at the same time, to have an excellent recovery property to recover to its original state when an external force applied thereto is removed.

In general, an adhesive is more easily deformed in a high-temperature region than in a low-temperature, but has a problem in that the recovery property to return to its original state after removal of an external force applied thereto is degraded in the high-temperature region.

When an adhesive is designed to have a low strain in consideration of the folding performance in the high-temperature region in order to overcome the above problem, another problem arises in that the strains at room temperature and low temperature are further decreased, so that the folding performance at room temperature and low temperature is degraded.

Meanwhile, in the low-temperature region, the elastic force of the adhesive film increases due to the glass transition temperature (Tg) of a polymer, and hence it is necessary to apply a greater force than the force applied in the high-temperature region in order to deform the adhesive film.

Typically, it is expected that an adhesive film, which requires a small force for deformation so as to be easily deformed even with a small force and is easily recovered to its original state, will have excellent folding performance. However, the force required for deformation and the recovery property are contrary to each other, and thus it is not easy in reality to satisfy all of them.

Therefore, there is an urgent need to develop technology of improving the folding performance of an adhesive film for application to a foldable display by improving the strain and recovery at room temperature and high temperature, allowing the adhesive film to have constant folding performance in a temperature range from a high-temperature region to a low-temperature region, and enabling the adhesive film to be easily deformed even with a small force and have an excellent recovery property.

BRIEF SUMMARY OF THE INVENTION

An object to be achieved by the present invention is to provide a foldable adhesive film which includes a free volume-increasing agent having a specific structure and thus may have improved strain and recovery at room temperature and high temperature and improved recovery in a low-temperature region and a room temperature region, and a fabrication method therefor.

However, the objects to be solved by the present invention are not limited to the above-mentioned object, and other objects which are not mentioned herein will be clearly understood by those skilled in the art from the following description.

One aspect of the present invention provides a foldable adhesive film including: an adhesive layer including a cured product of an adhesive composition; and a substrate provided on one surface of the adhesive layer, wherein the adhesive composition contains: a copolymer of a mixture containing a (meth)acrylate containing at least one alkyl group having 2 to 10 carbon atoms, a (meth)acrylate containing a polar group, and a free volume-increasing agent; and a crosslinking agent.

One aspect of the present invention provides a method for fabricating a foldable adhesive film, the method including steps of: providing an adhesive composition containing: a copolymer of a mixture containing a (meth)acrylate containing at least one alkyl group having 2 to 10 carbon atoms, a (meth)acrylate containing a polar group, and a free volume-increasing agent; and a crosslinking agent; applying the adhesive composition onto a substrate; and providing an adhesive layer by curing the adhesive composition.

Advantageous Effects

The foldable adhesive film according to one embodiment of the present invention may have improved folding performance by improving the creep strain thereof and minimizing the strain after recovery thereof after removal of an external force applied thereto.

The foldable adhesive film according to one embodiment of the present invention may have improved folding performance by improving the recovery thereof in a low-temperature region and minimizing an external force that applied for deformation of the foldable adhesive film.

The method for fabricating a foldable adhesive film according to one embodiment of the present invention includes a free volume-increasing agent and thus may maintain constant folding performance in a temperature range from a low-temperature region to a high-temperature range by controlling the strain and strain after recovery of the foldable adhesive film.

The method for fabricating a foldable adhesive film according to one embodiment of the present invention includes a free volume-increasing agent and thus may maintain constant folding performance in a temperature range from a low-temperature region to a high-temperature range by improving the recovery of the foldable adhesive film and minimizing a pressure that is applied for deformation.

BRIEF DESCRIPTION OF DRAWINGS

FIG. 1 is a schematic view of a sample for a dynamic folding test.

FIG. 2 is a schematic view of a dynamic folding test.

DETAILED DESCRIPTION OF THE INVENTION

Throughout the present specification, it is to be understood that when any part is referred to as "including" any component, it does not exclude other components, but may further include other components, unless otherwise specified.

Throughout the present specification, when any member is referred to as being "on" another member, it not only refers to a case where any member is in contact with another member, but also a case where a third member exists between the two members.

Throughout the present specification, the unit "parts by weight" may refer to the ratio of weight between components.

Throughout the present specification, the term "(meth) acrylate" is meant to include acrylate and methacrylate.

Throughout the present specification, "A and/or B" refers to "A and B" or "A or B".

Throughout the present specification, the term "monomer unit" may mean the reacted form of a monomer in a polymer, and specifically, may mean a state in which the monomer forms the backbone of the polymer, for example, a main chain or a side chain, through a polymerization reaction.

Throughout the present specification, the "weight-average molecular weight" and "number-average molecular weight" of any compound may be calculated using the molecular weight and molecular weight distribution of the compound. Specifically, the molecular weight and molecular weight distribution of a compound may be obtained by: placing tetrahydrofuran (THF) and the compound in a 1-ml glass vial to prepare a test sample in which the concentration of the compound is 1 wt %; filtering a standard sample (polystyrene) and the test sample through a filter (pore size: 0.45 μm); injecting each of the sample filtrates into a GPC injector; and comparing the elution time of the test sample with a calibration curve of the standard sample. At this time, Infinity II 1260 (Agilent Technologies, Inc.) may be used as a measurement instrument, and the flow rate and the column temperature may be set at 1.00 mL/min and 40.0° C., respectively.

Throughout the present specification, "glass transition temperature (Tg)" may be obtained by measuring the temperature at the maximum value of tan δ obtained when measuring the modulus of a sample at a frequency of 1 Hz using a rheometer (ARES-G2, TA Instruments) while heating the sample in a temperature range from −60° C. to 100° C. at a heating rate of 5° C./min.

Throughout the present specification, "free volume" may refer to a void space in which a chain can move freely in the polymer resin. Furthermore, in general, the glass transition temperature refers to the temperature at which polymers have a universal free volume, and when the temperature of a polymer resin is lowered to the glass transition temperature or below, the movement of the chain may stop.

Throughout the present specification, "increase in free volume" may mean an increase in the void space in which a chain can move freely in the polymer resin.

Hereinafter, the present invention will be described in more detail.

One embodiment of the present invention provides a foldable adhesive film including: an adhesive layer including a cured product of an adhesive composition; and a substrate provided on one surface of the adhesive layer, wherein the adhesive composition contains: a copolymer of a mixture containing a (meth)acrylate containing at least one alkyl group having 2 to 10 carbon atoms, a (meth)acrylate containing a polar group, and a free volume-increasing agent; and a crosslinking agent.

The foldable adhesive film according to one embodiment of the present invention may have improved folding performance by improving the creep strain thereof, minimizing the strain after recovery thereof after removal of an external force applied thereto, improving the recovery thereof in a low-temperature region, and minimizing the external force applied for deformation of the foldable adhesive film.

According to one embodiment of the present invention, the mixture may include a (meth)acrylate containing at least one alkyl group having 2 to 10 carbon atoms. Specifically, the mixture may include one or more selected from among ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, hexyl (meth)acrylate, 2-ethylhexyl (meth)acrylate, 2-ethylbutyl (meth)acrylate, n-octyl (meth)acrylate, and isooctyl (meth) acrylate. More specifically, the mixture preferably includes 2-ethylhexyl (meth)acrylate. By selecting the above-described monomer, it is possible to adjust the glass transition temperature of the cured product of the adhesive composition while ensuring the physical properties of the foldable adhesive film.

According to one embodiment of the present invention, the mixture may contain a (meth)acrylate containing a polar group. Specifically, examples of the (meth)acrylate compound having a polar group include (meth)acrylate compounds in which a substituent group containing an atom other than carbon and hydrogen is ester-bonded. Examples of the substituent include a hydroxyl group, an epoxy group, a glycidyl ether group, a tetrahydrofurfuryl group, an isocyanate group, a carboxyl group, an alkoxysilyl group, a phosphate ester group, a lactone group, an oxetane group, a tetrahydropyranyl group, and an amino group According to one embodiment of the present invention, the (meth)acrylate containing a polar group may be selected from among acrylic acid, 2-hydroxyethyl (meth)acrylate, 2-hydroxypropyl (meth)acrylate, 2-hydroxybutyl (meth) acrylate, 4-hydroxybutyl (meth)acrylate, cyclohexane dimethanol mono(meth)acrylate, glycidyl (meth)acrylate, 4-hydroxybutyl acrylate glycidyl ether, tetrahydrofurfuryl (meth) acrylate, 2-isocyanatoethyl (meth)acrylate, 2-(meth) acryloyloxyethyl succinate, 2-(meth)acryloyloxyethyl hexahydrophthate, 3-(meth)acryloxypropyltrimethoxysilane, 3-(meth)acryloxypropylmethyldimethoxysilane, 3-(meth)acryloxypropyltriethoxysilane, 3-(meth)acryloxypropylmethyldiethoxysilane, 2-(meth)acryloyloxyethyl phosphate, γ-butyllactone (meth)acrylate, (3-methyl-3-oxetanyl) (meth)acrylate, (3-ethyl-3-oxetanyl) (meth)acrylate, tetrahydrofurfuryl (meth)acrylate, dimethylaminoethyl (meth)acrylate, and diethylaminoethyl (meth)acrylate. More specifically, the (meth)acrylate containing a polar group may be acrylic acid. By selecting the (meth)acrylate containing a polar group from among those described above, it is possible to ensure the mechanical properties of the foldable adhesive film and adjust the degree of curing of the adhesive layer.

According to one embodiment of the present invention, the copolymer may be a copolymer obtained by polymerizing a mixture containing a (meth)acrylate containing at least one alkyl group having 2 to 10 carbon atoms, a (meth)acrylate containing a polar group, and a free volume-increasing agent. By polymerizing the monomers and the free volume-increasing agent as described above, it is possible to adjust the glass transition temperature of the cured product of the adhesive composition containing the polymer and improve the folding performance of the foldable adhesive film.

According to one embodiment of the present invention, the adhesive composition may contain a crosslinking agent. Specifically, examples of the crosslinking agent include, but are not limited to, bifunctional acrylates such as 1,4-butanediol di(meth)acrylate, 1,6-hexanediol di(meth)acrylate, neopentylglycol di(meth)acrylate, polyethyleneglycol di(meth)acrylate, neopentylglycol adipate di(meth)acrylate, dicyclopentanyl di(meth)acrylate, caprolactone-modified dicyclopentenyl di(meth)acrylate, ethylene oxide-modified di(meth)acrylate, di(meth)acryloxy ethyl isocyanurate, allylated cyclohexyl di(meth)acrylate, tricyclodecanedimethanol (meth)acrylate, dimethylol dicyclopentanedi(meth)acrylate, ethylene oxide-modified hexahydrophthalic acid di(meth)acrylate, tricyclodecane dimethanol (meth)acrylate, neopentyl glycol-modified trimethylpropane di(meth)acrylate, adamantane di(meth)acrylate or 9,9-bis[4-(2-acryloyloxyethoxy)phenyl]fluorene; trifunctional acrylates such as trimethylolpropane tri(meth)acrylate, dipentaerythritol tri (meth)acrylate, propionic acid-modified dipentaerythritol tri (meth)acrylate, pentaerythritol tri(meth)acrylate, propylene oxide-modified trimethylolpropane tri(meth)acrylate, trifunctional urethane (meth)acrylate or tris(meth)acryloxyethyl isocyanurate; tetrafunctional acrylates such as diglycerin tetra(meth)acrylate or pentaerythritol tetra(meth)acrylate; pentafunctional acrylates such as dipentaerythritol penta(meth)acrylate; and hexafunctional acrylates such as dipentaerythritol hexa(meth)acrylate, caprolactone-modified dipentaerythritol hexa(meth)acrylate, or urethane (meth)acrylates (for example, reaction products of an isocyanate monomer and trimethylolpropane tri(meth)acrylate). These may be used alone or in combination of two or more. By selecting the crosslinking agent from those described above, it is possible to adjust the crosslinking density (i.e., degree of curing) of the adhesive layer and adjust the physical properties of the adhesive layer of the foldable adhesive film.

According to one embodiment of the present invention, the glass transition temperature of the (meth)acrylate containing an alkyl group may be −80° C. to −30° C. Specifically, the glass transition temperature of the (meth)acrylate containing an alkyl group may be −75° C. to −35° C., −70° C. to −40° C., −68° C. to −45° C., or −65° C. to −50° C. Where the glass transition temperature of the (meth)acrylate containing an alkyl group is adjusted within the above-described range, it is possible to improve the folding performance of the foldable adhesive film by improving the recovery thereof in a low-temperature or high-temperature region.

According to one embodiment of the present invention, the glass transition temperature of the (meth)acrylate containing a polar group may be 50° C. to 150° C. Specifically, the glass transition temperature of the (meth)acrylate containing a polar group may be 55° C. to 145° C., 60° C. to 140° C., 65° C. to 135° C., 70° C. to 130° C., 75° C. to 125° C., 80° C. to 120° C., 85° C. to 115° C., 90° C. to 110° C., or 95° C. to 105° C. Where the glass transition temperature of the (meth)acrylate containing a polar group is adjusted within the above-described range, it is possible to improve the folding performance of the foldable adhesive film by improving the recovery thereof in a low-temperature or high-temperature region.

According to one embodiment of the present invention, the mixture may contain a free volume-increasing agent. Where the mixture contains the free volume-increasing agent as described above, it is possible to improve the creep strain and recovery of the foldable adhesive film.

According to one embodiment of the present invention, the free volume-increasing agent may include one or more selected from among the following Formulas 1 to 3:

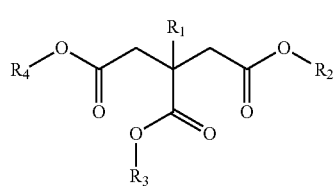

[Formula 1]

wherein $R_1$ is a hydrogen atom, a hydroxyl group, or an ester group having 2 to 6 carbon atoms; and $R_2$, $R_3$ and $R_4$ are each independently a substituted or unsubstituted, linear or branched alkyl group having 1 to 10 carbon atoms.

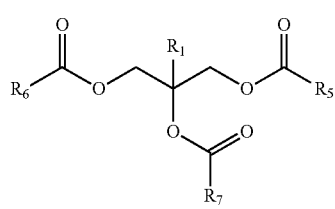

[Formula 2]

wherein $R_1$ is a hydrogen atom, a hydroxyl group, or an ester group having 2 to 6 carbon atoms; and $R_5$, $R_6$ and $R_7$ are each independently a substituted or unsubstituted, linear or branched alkyl group having 1 to 10 carbon atoms.

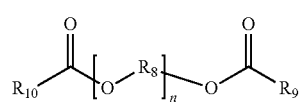

[Formula 3]

wherein $R_8$ is an alkylene group having 1 to 4 carbon atoms; $R_9$ and $R_{10}$ are each independently a substituted or unsubstituted, linear or branched alkyl group having 1 to 10 carbon atoms; and n is an integer ranging from 1 to 10.

More preferably, the free volume-increasing agent preferably includes one or more selected from among the following Formulas 4 to 9:

[Formula 4]

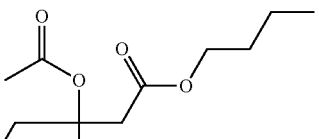

[Formula 5]

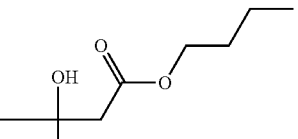

[Formula 6]

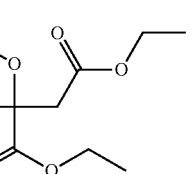

[Formula 7]

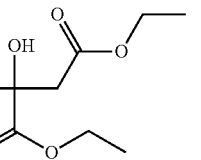

[Formula 8]

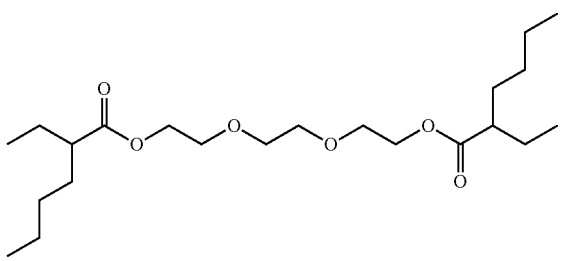

[Formula 9]

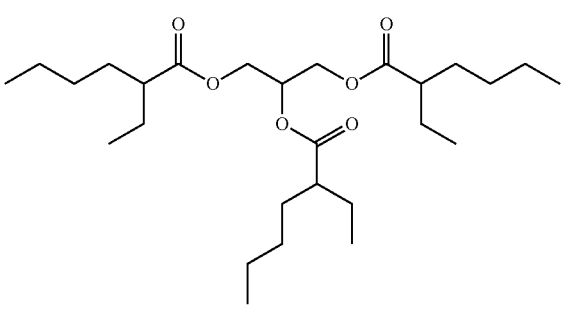

By selecting the free volume-increasing agent from among the above Formulas, it is possible to improve the creep strain of the foldable adhesive film at room temperature, high temperature and low temperature, improve the recovery thereof, and improve the folding performance thereof.

According to one embodiment of the present invention, the glass transition temperature of the cured product may be −80° C. to −20° C. Specifically, the glass transition temperature of the cured product may be −75° C. to −25° C., −70° C. to −30° C., −65° C. to −35° C., or −60° C. to −40° C. More specifically, the glass transition temperature of the cured product is preferably −40° C. By adjusting the glass transition temperature of the cured product within the above-described range, it is possible to improve the creep strain and recovery of the foldable adhesive film and minimize the force that is applied for deformation.

According to one embodiment of the present invention, the content of the (meth)acrylate containing an alkyl group in the mixture may be 80.0 wt % to 99.9 wt %. Specifically, the content of the (meth)acrylate containing an alkyl group may be 81.0 wt % to 99.5 wt %, 82.0 wt % to 99.0 wt %, 83.0 wt % to 98.5 wt %, 84.0 wt % to 98.0 wt %, 85.0 wt % to 97.5 wt %, or 86.0 wt % to 97.0 wt %. More specifically, the content of the (meth)acrylate containing an alkyl group is preferably 98.0 wt %. Where the content of the (meth)acrylate containing an alkyl group is adjusted within the above-described range, it is possible to satisfy the physical properties of the adhesive layer and effectively remove stress caused by folding by adjusting the glass transition temperature of the cured product of the adhesive composition.

According to one embodiment of the present invention, the content of the (meth)acrylate containing a polar group in the mixture may be 0.1 wt % to 20.0 wt %. Specifically, the content of the (meth)acrylate containing a polar group may be 0.2 wt % to 19.0 wt %, 0.3 wt % to 18.0 wt %, 0.4 wt % to 17.0 wt %, 0.5 wt % to 16.0 wt %, or 0.6 wt % to 15.0 wt %. More specifically, the content of the (meth)acrylate containing a polar group is preferably 0.1 wt % or 2.0 wt %. Where the content of the (meth)acrylate containing a polar group is adjusted within the above-described range, it is possible to adjust the glass transition temperature of the cured product of the adhesive composition.

According to one embodiment of the present invention, the content of the free volume-increasing agent may be 5 parts by weight to 20 parts by weight based on 100 parts by weight of the mixture of the (meth)acrylate containing an alkyl group and the (meth)acrylate containing a polar group. Specifically, the content of the free volume-increasing agent may be 6 parts by weight to 17 parts by weight, 7 parts by weight to 15 parts by weight, 8 parts by weight to 13 parts by weight, or 9 parts by weight to 10 parts by weight, based on 100 parts by weight of the mixture of the (meth)acrylate containing an alkyl group and the (meth)acrylate containing a polar group. More specifically, the content of the free volume-increasing agent is preferably 7 parts by weight to 10 parts by weight based on 100 parts by weight of the mixture of the (meth)acrylate containing an alkyl group and the (meth)acrylate containing a polar group. By adjusting the content of the free volume-increasing agent within the above-described range, it is possible to improve the recovery of the foldable adhesive film and improve the folding performance thereof.

According to one embodiment of the present invention, the content of the crosslinking agent may be 0.1 to 1.0 equivalent relative to the copolymer. Specifically, the content of the crosslinking agent may be 0.2 to 0.9 equivalents, 0.3 to 0.8 equivalents, 0.4 to 0.7 equivalents, or 0.5 to 0.6 equivalents, relative to the mixture. By adjusting the content of the crosslinking agent within the above-described range, it is possible to adjust the crosslinking density (i.e., degree of curing) of the adhesive layer and adjust the physical properties of the adhesive layer of the foldable adhesive film.

According to one embodiment of the present invention, the foldable adhesive film may include a substrate provided on one surface of the adhesive layer. Specifically, by including the substrate, it is possible to ensure the basic physical properties of the foldable adhesive film and protect the screen of a foldable display device to which the foldable adhesive film is applied.

According to one embodiment of the present invention, the substrate may be a polyethylene terephthalate film, a polytetrafluoroethylene film, a polyethylene film, a polypropylene film, a polybutene film, a polybutadiene film, a vinyl chloride copolymer film, a polyurethane film, an ethylene-vinyl acetate film, an ethylene-propylene copolymer film, an ethylene-ethyl acrylate copolymer film, an ethylene-methyl acrylate copolymer film, or a polyimide film, but is not limited thereto.

According to one embodiment of the present invention, the thickness of the substrate may be 10 µm to 150 µm, 50 µm to 125 µm, or 50 µm to 100 µm. By adjusting the thickness of the substrate within the above-described range, it is possible to effectively remove stress which occurs when the foldable adhesive film is folded, and to improve the recovery of the foldable adhesive film.

According to one embodiment of the present invention, the foldable adhesive film may further include a release film. Specifically, the substrate, the adhesive layer and the release film may be sequentially laminated to fabricate a foldable adhesive film.

According to one embodiment of the present invention, the foldable adhesive film has a creep strain of 100% or more as measured by applying a pressure of 10,000 Pa for 600 seconds at 25° C. Specifically, the foldable adhesive film may have a creep strain of 100% to 200%, 110% to 190%, 120% to 180%, 130% to 170%, or 140% to 160%, as measured by applying a pressure of 10,000 Pa for 600 seconds at 25° C. By adjusting the creep strain at 25° C. within the above-described range, it is possible to improve the folding performance of the foldable adhesive film.

In the present specification, the term "creep strain" refers to a value obtained by measuring the percentage of the length stretched (i.e., strain) by applying a certain pressure corresponding to stress for a certain time. In the present invention, the term "creep strain" refers to a value obtained by measuring the percentage of the length stretched by applying a pressure of 10,000 Pa for 600 seconds.

According to one embodiment of the present invention, the foldable adhesive film may have a strain after recovery of 15% or less as measured 600 seconds after removal of the pressure applied at 25° C. Specifically, the foldable adhesive film may have a strain after recovery of more than 0% to not more than 15%, 1% to 14%, 2% to 13%, 3% to 13%, 4% to 12%, 5% to 11%, or 6% to 10%, as measured 600 seconds after removal of the pressure applied at 25° C. By adjusting the strain after recovery of the foldable adhesive film within the above-described range, it is possible to improve the folding performance of the foldable adhesive film.

In the present specification, the term "strain after recovery" refers to a value obtained by measuring the percentage of the length that has not been recovered (i.e., strain) even a certain time after removal of a certain pressure corresponding to stress after stretching the film by applying the pressure for a certain time. In the present invention, the term "strain after recovery" refers to a value obtained by measuring the percentage of the unrecovered length 600 seconds after removal of a pressure of 10,000 Pa that has been applied for 600 seconds.

According to one embodiment of the present invention, the foldable adhesive film has a creep strain of 100% or more, as measured by applying a pressure of 10,000 Pa for 600 seconds at 60° C. Specifically, the foldable adhesive film may have a creep strain of 100% to 200%, 110% to 190%, 120% to 180%, 130% to 170%, or 140% to 160%, as measured by applying a pressure of 10,000 Pa for 600 seconds at 60° C. By adjusting the creep strain at 60° C. within the above-described range, it is possible to improve the folding performance of the foldable adhesive film.

According to one embodiment of the present invention, the foldable adhesive film may have a strain after recovery of 15% or less, as measured 600 seconds after removal of the pressure applied at 60° C. Specifically, the foldable adhesive film may have a strain after recovery of more than 0% to not more than 15%, 1% to 14%, 2% to 13%, 3% to 13%, 4% to 12%, 5% to 11%, or 6% to 10%, as measured 600 seconds after removal of the pressure at 60° C. By adjusting the strain after recovery of the foldable adhesive film within the above range, it is possible to improve the folding performance of the foldable adhesive film.

As described above, it is possible to improve the folding performance at room temperature and high temperature by adjusting the creep strain and strain after recovery at 25° C. and 60° C.

According to one embodiment of the present invention, the initial pressure applied to the foldable adhesive film at 25° C. so as for the foldable adhesive film to have a strain of 12% is 10,000 Pa or less. Specifically, the initial pressure applied to the foldable adhesive film at 25° C. so as for the foldable adhesive film to have a strain of 12% may be more than 0 Pa to not more than 10,000 Pa, 1,000 Pa to 9,000 Pa, 1,500 Pa to 8,500 Pa, 2,000 Pa to 8,000 Pa, 2,500 Pa to 7,500 Pa, 3,000 Pa to 7,000 Pa, 3,500 Pa to 6,500 Pa, 4,000 Pa to 6,000 Pa, or 3,500 Pa to 5,500 Pa. By adjusting the initial pressure within the above-described range, it is possible to improve the folding performance of the foldable adhesive film at room temperature.

In the present invention, the term "initial pressure" refers to a pressure applied to stretch the film so as for the film to have a strain of 12%, and the term "strain" refers to the ratio of the increment in the film length after pressure application to the film length before pressure application. That is, in the present invention, the term "strain" refers to a value obtained by measuring the length of the foldable adhesive film before pressure application and the length of the foldable adhesive film after pressure application, and then dividing the length increment caused by pressure application by the length before pressure application.

According to one embodiment of the present invention, the foldable adhesive film may have a recovery of 85% or more, as measured 600 seconds after removal of the initial pressure applied at 25° C. Specifically, the foldable adhesive film may have a recovery of 85% to 100%, 87.5% to 100%, 90% to 100%, 92.5% to 100%, or 95% to 100%, as measured 600 seconds after removal of the initial pressure. By adjusting the recovery of the foldable adhesive film within the above-described range, it is possible to improve the folding performance of the foldable adhesive film.

In the present specification, the term "recovery" refers to a value obtained by deforming the film so as for the film to have a certain strain by pressure application and then measuring the ratio of the length a certain time after removal of the pressure to the original length of the film. In the present invention, the term "recovery" refers to a value obtained by deforming the foldable adhesive film so as for the foldable adhesive film to have a strain of 12% by pressure application, and then subtracting the percentage of the unrecovered length 600 seconds after removal of the pressure from 100%.

According to one embodiment of the present invention, the initial pressure applied to the foldable adhesive film at −20° C. so as for the foldable adhesive film to have a strain of 12% may be 12,000 Pa or less. Specifically, the initial pressure applied to the foldable adhesive film at −20° C. so as for the foldable adhesive film to have a strain of 12% may be more than 0 Pa to not more than 12,000 Pa, 1,000 Pa to 11,000 Pa, 1,500 Pa to 10,000 Pa, 2,000 Pa to 9,000 Pa, 2,500 Pa to 8,000 Pa, 3,000 Pa to 7,000 Pa, 3,500 Pa to 6,500 Pa, 4,000 Pa to 6,000 Pa, or 3,500 Pa to 5,500 Pa. By adjusting the initial pressure within the above-described range, it is possible to improve the folding performance of the foldable adhesive film.

According to one embodiment of the present invention, the foldable adhesive film may have a recovery of 85% or more, as measured 600 seconds after removal of the initial pressure applied at −20° C. Specifically, the foldable adhesive film may have a recovery of 85% to 100%, 87.5% to 100%, 90% to 100%, 92.5% to 100%, or 95% to 100%, as measured 600 seconds after removal of the initial pressure. By adjusting the recovery of the foldable adhesive film within the above-described range, it is possible to improve the folding performance of the foldable adhesive film.

As described above, by adjusting the initial pressure and recovery at −20° C. and 25° C., it is possible to improve the folding performance in a low-temperature region and a room temperature region and maintain the constant folding performance in a temperature range from a low-temperature region to a high-temperature region.

Another embodiment of the present invention provides a method for fabricating a foldable adhesive film, the method including steps of: providing an adhesive composition containing: a copolymer of a mixture containing a (meth) acrylate containing at least one alkyl group having 2 to 10 carbon atoms, a (meth)acrylate containing a polar group, and a free volume-increasing agent; and a crosslinking agent; applying the adhesive composition onto a substrate; and providing an adhesive layer by curing the adhesive composition.

The method for fabricating a foldable adhesive film according to another embodiment of the present invention includes a free volume-increasing agent, and thus may maintain constant folding performance in a temperature range from a low-temperature region to a high-temperature region by adjusting the strain and recovery of the foldable adhesive film and minimizing the force that is applied for deformation.

The contents in the method for fabricating a foldable adhesive film, which are the same as those described above with respect to the foldable adhesive film according to one embodiment of the present invention, will be omitted.

According to one embodiment of the present invention, the mixture may contain a free volume-increasing agent. Where the mixture contains the free volume-increasing agent as described above, it is possible to improve the creep strain and recovery of the foldable adhesive film.

According to one embodiment of the present invention, the free volume-increasing agent may include one or more selected from among the following Formulas 1 to 3:

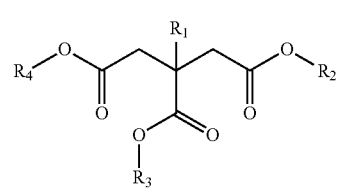

[Formula 1]

wherein $R_1$ is a hydrogen atom, a hydroxyl group, or an ester group having 2 to 6 carbon atoms; and $R_2$, $R_3$ and $R_4$ are each independently a substituted or unsubstituted, linear or branched alkyl group having 1 to 10 carbon atoms.

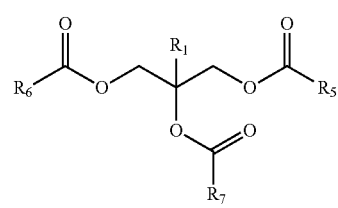

[Formula 2]

wherein $R_1$ is a hydrogen atom, a hydroxyl group, or an ester group having 2 to 6 carbon atoms; and $R_5$, $R_6$ and $R_7$ are each independently a substituted or unsubstituted, linear or branched alkyl group having 1 to 10 carbon atoms.

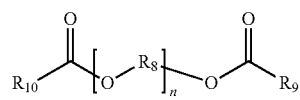

[Formula 3]

wherein $R_8$ is an alkylene group having 1 to 4 carbon atoms; $R_9$ and $R_{10}$ are each independently a substituted or unsubstituted, linear or branched alkyl group having 1 to 10 carbon atoms; and n is an integer ranging from 1 to 10.

More preferably, the free volume-increasing agent preferably includes one or more selected from among the following Formulas 4 to 9:

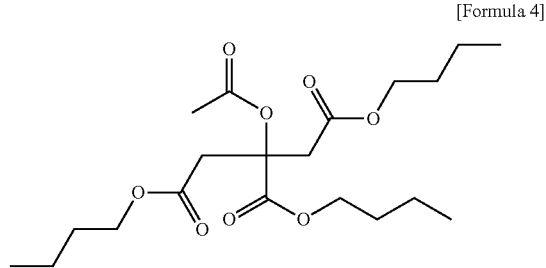

[Formula 4]

-continued

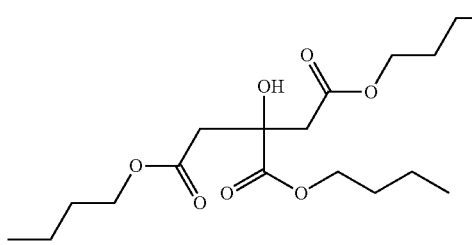
[Formula 5]

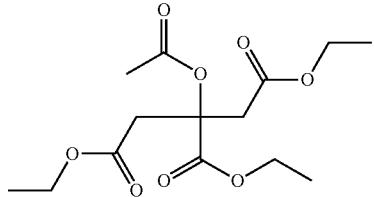
[Formula 6]

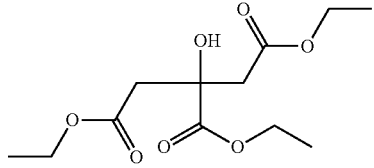
[Formula 7]

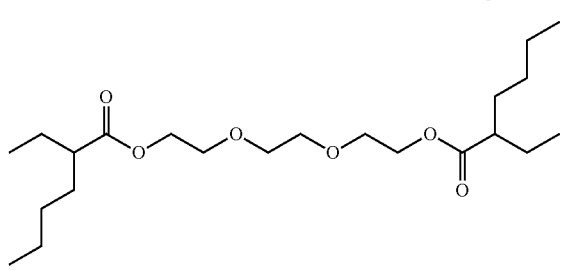
[Formula 8]

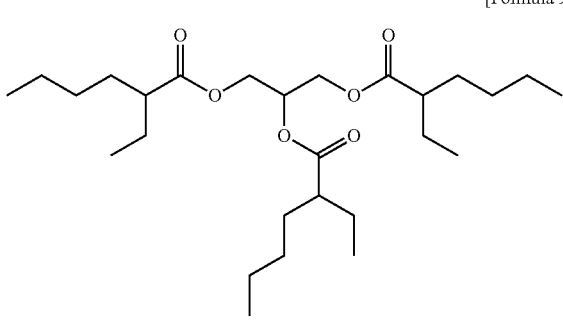
[Formula 9]

By selecting the free volume-increasing agent from among the above Formulas, it is possible to improve the creep strain of the foldable adhesive film at room temperature, high temperature and low temperature, improve the recovery thereof, and improve the folding performance thereof.

According to one embodiment of the present invention, the foldable adhesive film has a creep strain of 100% or more as measured by applying a pressure of 10,000 Pa for 600 seconds at 25° C. Specifically, the foldable adhesive film may have a creep strain of 100% to 200%, 110% to 190%, 120% to 180%, 130% to 170%, or 140% to 160%, as measured by applying a pressure of 10,000 Pa for 600 seconds at 25° C. By adjusting the creep strain at 25° C. within the above-described range, it is possible to improve the folding performance of the foldable adhesive film.

In the present specification, the term "creep strain" refers to a value obtained by measuring the percentage of the length stretched (i.e., strain) by applying a certain pressure for a certain time. In the present invention, the term "creep strain" refers to a value obtained by measuring the percentage of the length stretched by applying a pressure of 10,000 Pa for 600 seconds.

According to one embodiment of the present invention, the foldable adhesive film have a strain after recovery of 15% or less as measured 600 seconds after removal of the pressure applied at 25° C. Specifically, the foldable adhesive film may have a strain after recovery of more than 0% to not more than 15%, 1% to 14%, 2% to 13%, 3% to 13%, 4% to 12%, 5% to 11%, or 6% to 10%, as measured 600 seconds after removal of the pressure applied at 25° C. By adjusting the strain after recovery of the foldable adhesive film within the above-described range, it is possible to improve the folding performance of the foldable adhesive film.

In the present specification, the term "strain after recovery" refers to a value obtained by measuring the percentage of the length (i.e., strain) that has not been recovered even a certain time after removal of a certain pressure after stretching the film by applying the pressure for a certain time. In the present invention, the term "strain after recovery" refers to a value obtained by measuring the percentage of the unrecovered length 600 seconds after removal of a pressure of 10,000 Pa that has been applied for 600 seconds.

According to one embodiment of the present invention, the foldable adhesive film has a creep strain of 100% or more, as measured by applying a pressure of 10,000 Pa for 600 seconds at 60° C. Specifically, the foldable adhesive film may have a creep strain of 100% to 200%, 110% to 190%, 120% to 180%, 130% to 170%, or 140% to 160%, as measured by applying a pressure of 10,000 Pa for 600 seconds at 60° C. By adjusting the creep strain at 60° C. within the above-described range, it is possible to improve the folding performance of the foldable adhesive film.

According to one embodiment of the present invention, the foldable adhesive film may have a strain after recovery of 15% or less, as measured 600 seconds after removal of the pressure applied at 60° C. Specifically, the foldable adhesive film may have a strain after recovery of more than 0% to not more than 15%, 1% to 14%, 2% to 13%, 3% to 13%, 4% to 12%, 5% to 11%, or 6% to 10%, as measured 600 seconds after removal of the pressure applied at 60° C. By adjusting the strain after recovery of the foldable adhesive film within the above range, it is possible to improve the folding performance of the foldable adhesive film.

As described above, it is possible to improve the folding performance at room temperature and high temperature by adjusting the creep strain and strain after recovery at 25° C. and 60° C.

According to one embodiment of the present invention, the initial pressure applied to the foldable adhesive film at 25° C. so as for the foldable adhesive film to have a strain of 12% is 10,000 Pa or less. Specifically, the initial pressure applied to the foldable adhesive film at 25° C. so as for the foldable adhesive film to have a strain of 12% may be more than 0 Pa to not more than 10,000 Pa, 1,000 Pa to 9,000 Pa, 1,500 Pa to 8,500 Pa, 2,000 Pa to 8,000 Pa, 2,500 Pa to 7,500 Pa, 3,000 Pa to 7,000 Pa, 3,500 Pa to 6,500 Pa, 4,000 Pa to 6,000 Pa, or 3,500 Pa to 5,500 Pa. By adjusting the initial pressure within the above-described range, it is possible to improve the folding performance of the foldable adhesive film at room temperature.

In the present invention, the term "initial pressure" refers to a pressure applied to stretch the film so as for the film to have a strain of 12%, and the term "strain" refers to the ratio of the increment in the film length after pressure application to the film length before pressure application. That is, in the present invention, the term "strain" refers to a value obtained by measuring the length of the foldable adhesive film before pressure application and the length of the foldable adhesive film after pressure application, and then dividing the length increment caused by pressure application by the length before pressure application.

According to one embodiment of the present invention, the foldable adhesive film may have a recovery of 85% or more, as measured 600 seconds after removal of the initial pressure applied at 25° C. Specifically, the foldable adhesive film may have a recovery of 85% to 100%, 87.5% to 100%, 90% to 100%, 92.5% to 100%, or 95% to 100%, as measured 600 seconds after removal of the initial pressure. By adjusting the recovery of the foldable adhesive film within the above-described range, it is possible to improve the folding performance of the foldable adhesive film.

In the present specification, the term "recovery" refers to a value obtained by deforming the film so as for the film to have a certain strain by pressure application and then measuring the ratio of the length a certain time after removal of the pressure to the original length of the film. In the present invention, the term "recovery" refers to a value obtained by deforming the foldable adhesive film so as for the foldable adhesive film to have a strain of 12% by pressure application, and then subtracting the percentage of the unrecovered length 600 seconds after removal of the pressure from 100%.

According to one embodiment of the present invention, the initial pressure applied to the foldable adhesive film at −20° C. so as for the foldable adhesive film to have a strain of 12% may be 12,000 Pa or less. Specifically, the initial pressure applied to the foldable adhesive film at −20° C. so as for the foldable adhesive film to have a strain of 12% at −20° C. may be more than 0 Pa to not more than 12,000 Pa, 1,000 Pa to 11,000 Pa, 1,500 Pa to 10,000 Pa, 2,000 Pa to 9,000 Pa, 2,500 Pa to 8,000 Pa, 3,000 Pa to 7,000 Pa, 3,500 Pa to 6,500 Pa, 4,000 Pa to 6,000 Pa, or 3,500 Pa to 5,500 Pa. By adjusting the initial pressure within the above-described range, it is possible to improve the folding performance of the foldable adhesive film.

According to one embodiment of the present invention, the foldable adhesive film may have a recovery of 85% or more, as measured 600 seconds after removal of the initial pressure applied at −20° C. Specifically, the foldable adhesive film may have a recovery of 85% to 100%, 87.5% to 100%, 90% to 100%, 92.5% to 100%, or 95% to 100%, as measured 600 seconds after removal of the initial pressure. By adjusting the recovery of the foldable adhesive film within the above-described range, it is possible to improve the folding performance of the foldable adhesive film.

As described above, by adjusting the initial pressure and recovery at −20° C. and 25° C., it is possible to improve the folding performance in a low-temperature region and a room temperature region and maintain the constant folding performance in a temperature range from a low-temperature region to a high-temperature region.

According to one embodiment of the present invention, the method includes a step of applying the adhesive composition onto a substrate. The method of applying the adhesive composition is not particularly limited. Specifically, the method of applying the adhesive composition onto the substrate may be performed using an applicator coating, a bar coater, a comma coater, or the like.

According to one embodiment of the present invention, the thickness of the adhesive layer may be 10 μm to 100 μm. Specifically, the thickness of the adhesive layer may be 15 μm to 80 μm, 20 μm to 60 μm, or 25 μm to 40 μm. By adjusting the thickness of the adhesive layer within the above-described range, it is possible to adjust the step coverage property and adhesive strength of the foldable adhesive film.

According to one embodiment of the present invention, the method includes a step of providing an adhesive layer by curing the adhesive composition. Specifically, the method of curing the adhesive composition is not particularly limited. Specifically, the method of curing the adhesive composition may be heat curing, photocuring with UV irradiation, or photocuring with E-beam irradiation. By selecting the above-described curing method, it is possible to form the adhesive layer included in the foldable adhesive film and ensure the physical properties required for the adhesive layer.

Hereinafter, the present invention will be described in detail with reference to examples. However, the examples according to the present invention may be modified into various different forms, and the scope of the present invention is not construed as being limited to the examples described below. The examples in the present specification are provided to more completely describe the present invention to those skilled in the art.

Example 1

(1) Production of Copolymer

A monomer mixture including a mixture containing 98 wt % of 2-ethylhexyl acrylate (2-EHA) and 2 wt % of acrylic acid (AA), and based on 100 parts by weight of the mixture, 10 parts by weight of a free volume-increasing agent represented by the following Formula 4, was introduced into a 1-L reactor, followed by introduction of ethyl acetate (EAc) as a solvent. Next, the reactor was purged with nitrogen gas for about 1 hour to remove oxygen, and then maintained at a temperature of 62° C. After the monomer mixture was homogenized, 400 ppm of azobisisobutyronitrile (AIBN) as a reaction initiator and 400 ppm of n-dodecylmercaptan (n-DDM) as a chain transfer agent were added thereto, and the monomer mixture was allowed to react. After completion of the reaction, the reaction product was diluted with ethyl acetate, thereby producing a copolymer having a weight-average molecular weight of 2,000,000.

[Formula 4]

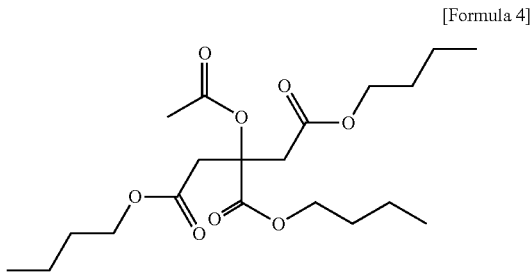 [SMILES: CCCCOC(=O)CC(CC(=O)OCCCC)(OC(C)=O)C(=O)OCCCC]

(2) Preparation of Adhesive Composition

The epoxy-based crosslinking agent BXX-5240 and the isocyanate-based crosslinking agent BXX-5627 were added to 100 g of the produced copolymer, and the mixture was diluted in an ethyl acetate solution at a concentration of 18 wt %. The crosslinking agent was added in an amount of 0.4 equivalents. The resulting mixture was diluted with a solid content-adjusting solvent to have a viscosity (500 cp to 1,500 cp) suitable for coating, and then stirred using a mechanical stir for 15 minutes or more. Next, in order to remove bubbles generated during the mixing, the stirred mixture was sealed and then left to stand at room temperature for 1 hour.

(3) Fabrication of Adhesive Film

The adhesive composition was applied onto a release film by means of a comma coater to form a coating layer, and then dried at a temperature of 130° C. or below for 3 minutes, thereby fabricating an adhesive film having a thickness of 25 μm.

Example 2

An adhesive film was fabricated in the same manner as in Example 1, except that the free volume-increasing agent was used in an amount of 7 parts by weight.

Example 3-1

An adhesive film was fabricated in the same manner as in Example 1, except that the free volume-increasing agent was used in an amount of 7 parts by weight and the crosslinking agent was used in an amount of 0.3 equivalents.

Example 3-2

An adhesive film was fabricated in the same manner as in Example 1, except that the free volume-increasing agent was used in an amount of 7 parts by weight and the crosslinking agents were used in an amount of 0.6 equivalents.

Example 4

An adhesive film was fabricated in the same manner as in Example 1, except that a free volume-increasing agent represented by the following Formula 5 was used.

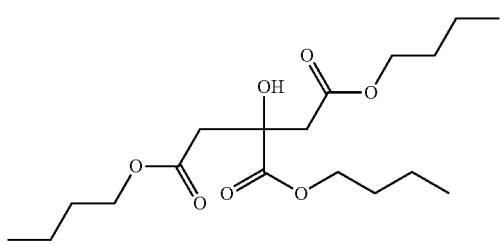

[Formula 5]

Example 5

An adhesive film was fabricated in the same manner as in Example 1, except that a free volume-increasing agent represented by the following Formula 8 was used.

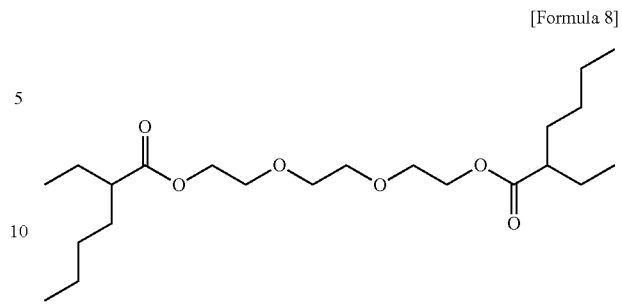

[Formula 8]

Example 6

An adhesive film was fabricated in the same manner as in Example 1, except that a free volume-increasing agent represented by the following Formula 9 was used.

[Formula 9]

Comparative Example 1

An adhesive film was fabricated in the same manner as in Example 1, except that the free volume-increasing agent was not used and the crosslinking agent was used in an amount of 0.2 equivalents.

Comparative Example 2

An adhesive film was fabricated in the same manner as in Example 1, except that the free volume-increasing agent was not used.

Comparative Example 3

An adhesive film was fabricated in the same manner as in Example 1, except that the free volume-increasing agent was not used, butyl acrylate (BA) was used instead of 2-ethylhexyl acrylate (2-EHA), the glass transition temperature of the cured product was adjusted to −35° C., and the crosslinking agent was used in an amount of 0.2 equivalents.

Comparative Example 4-1

An adhesive film was fabricated in the same manner as in Example 1, except that the free volume-increasing agent was not used, 94 wt % of butyl acrylate (BA) and 6 wt % of acrylic acid were used instead of 2-ethylhexyl acrylate (2-EHA), the glass transition temperature of the cured product was adjusted to −25° C., and the crosslinking agent was used in an amount of 0.2 equivalents.

Comparative Example 4-2

An adhesive film was fabricated in the same manner as in Example 1, except that the free volume-increasing agent was not used, 94 wt % of butyl acrylate (BA) and 6 wt % of acrylic acid were used instead of 2-ethylhexyl acrylate (2-EHA), the glass transition temperature of the cured product was adjusted to −25° C., and the crosslinking agent was used in an amount of 0.1 equivalents.

Comparative Example 5

An adhesive film was fabricated in the same manner as in Example 1, except that the free volume-increasing agent was not used, carbitol acrylate (ethoxyethoxyethyl acrylate) was used instead of 2-ethylhexyl acrylate (2-EHA), the glass transition temperature of the cured product was adjusted to −42° C., and the crosslinking agent was used in an amount of 1 equivalent.

Comparative Example 6

An adhesive film was fabricated in the same manner as in Example 1, except that the free volume-increasing agent was not used, beta-carboxyethyl acrylate was used instead of acrylic acid, the glass transition temperature of the cured product was adjusted to −41° C., and the crosslinking agent was used in an amount of 0.2 equivalents.

Experimental Example 1 (Measurement of Creep Strain)

The creep strains, at 25° C. and 60° C., of the adhesive films fabricated in Examples 1, 2, 3-1 and 4 to 6 and Comparative Examples 1 to 3, 4-1, 5 and 6 were measured.

The creep strain was a value obtained by applying a pressure of 10,000 Pa to each adhesive film for 600 seconds, and then immediately measuring the percentage of the stretched length (i.e., strain) of the adhesive film.

Experimental Example 2 (Measurement of Strain After Recovery)

The strains after recovery of the adhesive films fabricated in Examples 1, 2, 3-1 and 4 to 6 and Comparative Examples 1 to 3, 4-1, 5 and 6 were measured.

The strain after recovery was a value obtained by applying a pressure of 10,000 Pa to each adhesive film for 600 seconds, and then measuring the percentage of the stretched length (i.e., strain) of the adhesive film 600 seconds after removal of the pressure.

Experimental Example 3 (Dynamic Folding Tests at 25° C. and 60° C.)

FIG. 1 is a schematic view of a sample for a dynamic folding test. Specifically, samples, each having a size of 7.8×14 cm, were prepared by sequentially stacking a hard coating layer, a 50-μm-thick polyimide film, a hard coating layer, each of the adhesive layers fabricated in Examples 1, 2, 3-1 and 4 to 6 and Comparative Examples 1 to 3, 4-1, 5 and 6, a polarizing plate, each of the adhesive layers fabricated in Examples 1, 2, 3-1 and 4 to 6 and Comparative Examples 1 to 3, 4-1, 5 and 6, and a layer simulating a display panel.

FIG. 2 is a schematic view of a dynamic folding test. Referring to FIG. 2, after each sample was prepared, it was sandwiched between parallel plates having a spacing of 5 mm, and then subjected to a dynamic folding test in which it was folded and unfolded 200,000 times at each of 25° C. and 60° C. After completion of the test, each sample was collected and visually observed as to whether bubbles, exfoliation, and hard coating layer cracking occurred. Evaluation was performed as follows. OK: no bubbles, exfoliation, and hard coating layer cracking occurred; and N.G.: bubbles, exfoliation, or hard coating layer cracking occurred.

Table 1 below summarizes the results obtained according to Experimental Examples 1 to 3 and the results of visually observing whether there is a fold mark in the folding portion after performing the experiment according to Experimental Example 3.

TABLE 1

| | Strain (%) at 25° C. | | Strain (%) at 60° C. | | Dynamic folding test | | Whether there is fold mark in folding portion after dynamic folding test | |
|---|---|---|---|---|---|---|---|---|
| | Creep strain | Strain after recovery | Creep strain | Strain after recovery | 25° C. | 60° C. | 25° C. | 60° C. |
| Example 1 | 121.4 | 8.4 | 120.5 | 5.1 | OK | OK | OK | OK |
| Example 2 | 105.7 | 8.2 | 104.5 | 3.6 | OK | OK | OK | OK |
| Example 3-1 | 139.2 | 13.5 | 163.6 | 9.0 | OK | OK | OK | OK |
| Example 4 | 124.2 | 8.7 | 124.2 | 5.6 | OK | OK | OK | OK |
| Example 5 | 125.2 | 8.1 | 124.9 | 5.4 | OK | OK | OK | OK |
| Example 6 | 123.1 | 7.3 | 122.8 | 5.2 | OK | OK | OK | OK |
| Comparative Example 1 | 132 | 21.5 | 225.8 | 28.2 | OK | OK | NG | NG |
| Comparative Example 2 | 85 | 6.4 | 95 | 3.6 | NG | NG | — | — |
| Comparative Example 3 | 80 | 14.2 | 183 | 17.2 | NG | OK | — | NG |
| Comparative Example 4-1 | 17 | 1.6 | 24.2 | 2.1 | NG | NG | — | — |
| Comparative Example 5 | 243 | 34.4 | 564 | 201 | OK | OK | NG | NG |
| Comparative Example 6 | 162 | 25 | 352 | 43.2 | OK | OK | NG | NG |

Referring to Table 1 above, it was confirmed that Examples 1, 2, 3-1 and 4 to 6, which included the free volume-increasing agents of Formulas 1 to 3 above, showed improved creep strains in the high-temperature region and the room temperature region, and showed decreased strains after recovery. That is, it was confirmed that the folding performance was improved by improving both contrary physical properties (strain and recovery), and that, even after the dynamic folding test was performed, no bubbles, exfoliation, and hard coating layer cracking occurred, and no fold mark occurred in the folding portion (folding position).

In contrast, it was confirmed that Comparative Examples 1 to 3, 4-1, 5 and 6, which included no free volume-increasing agent, satisfied neither of the creep strain at room temperature and the strain after recovery at room temperature. It was confirmed that Comparative Examples 3 and 4-1 did not satisfy the glass transition temperature, and thus did not satisfy the dynamic folding test at room temperature, and even though they satisfied the dynamic folding test at high temperature, a fold mark remained in the folding portion.

In addition, it was confirmed that, in Comparative Examples 5 and 6, which included no free volume-increasing agent even though the glass transition temperatures were adjusted to those similar to in Examples 1, 2, 3-1 and 4 to 6 by combining the (meth)acrylate monomers, the strains after recovery in the room temperature region and the high-temperature region were not satisfied, and a fold mark occurred in the folding portion (folding position).

Experimental Example 4 (Measurement of Initial Pressure)

For the adhesive films fabricated in Examples 1, 2, 3-2 and 4 to 6 and Comparative Examples 1 to 3 and 4-2, the initial pressures at −20° C. and 25° C. were measured.

The initial pressure was a value obtained by measuring a pressure, applied to each film so as for each film to a strain of 12%, by a viscoelasticity measuring device (DMA, TA Instruments).

Experimental Example 5 (Measurement of Recovery)

For the adhesive films fabricated in Examples 1, 2, 3-2 and 4 to 6 and Comparative Examples 1 to 3 and 4-2, the recoveries at −20° C. and 25° C. were measured.

The strain after recovery was a value obtained by deforming each foldable adhesive film so as for each foldable adhesive film to have a strain of 12% by pressure application, and then measuring the percentage of the unrecovered length 600 seconds after removal of the pressure.

Experimental Example 6 (Dynamic Folding Tests at 25° C. and −20° C.)

FIG. 1 is a schematic view of a sample for a dynamic folding test. Specifically, samples, each having a size of 7.8×14 cm, were prepared by sequentially stacking a hard coating layer, a 50-μm-thick polyimide film, a hard coating layer, each of the adhesive layers fabricated in in Examples 1, 2, 3-2 and 4 to 6 and Comparative Examples 1 to 3 and 4-2, a polarizing plate, each of the adhesive layers fabricated in in Examples 1, 2, 3-2 and 4 to 6 and Comparative Examples 1 to 3 and 4-2, and a layer simulating a display panel.

FIG. 2 is a schematic view of a dynamic folding test. Referring to FIG. 2, after each sample was prepared, it was sandwiched between parallel plates having a spacing of 5 mm, and then subjected to a dynamic folding test in which it was folded and unfolded 200,000 times at each of 25° C. and −20° C. After completion of the test, each sample was collected and visually observed as to whether bubbles, exfoliation, and hard coating layer cracking occurred. Evaluation was performed as follows. OK: no bubbles, exfoliation, and hard coating layer cracking occurred; and N.G.: bubbles, exfoliation, or hard coating layer cracking occurred.

Table 2 below summarizes the results obtained according to Experimental Examples 4 to 6 and the results of visually observing whether there is a fold mark in the folding portion after performing the experiment according to Experimental Example 6

TABLE 2

|  | 25° C. | | −20° C. | | Dynamic folding test | | Whether there is fold mark in folding portion after dynamic folding test | |
|---|---|---|---|---|---|---|---|---|
|  | Initial pressure | Recovery | Initial pressure | Recovery | 25° C. | −20° C. | 25° C. | −20° C. |
| Example 1 | 5808 | 95.4 | 10355 | 90.7 | OK | OK | OK | OK |
| Example 2 | 7532 | 94.8 | 10514 | 90.3 | OK | OK | OK | OK |
| Example 3-2 | 7866 | 97.8 | 11090 | 93.4 | OK | OK | OK | OK |
| Example 4 | 5959 | 94.2 | 10020 | 89.2 | OK | OK | OK | OK |
| Example 5 | 5746 | 96.3 | 9984 | 91.2 | OK | OK | OK | OK |
| Example 6 | 5857 | 95.5 | 10158 | 90.5 | OK | OK | OK | OK |
| Comparative Example 1 | 7066 | 78.1 | 12658 | 84.5 | OK | NG | NG | NG |
| Comparative Example 2 | 9126 | 92.1 | 15268 | 91 | NG | NG | — | — |
| Comparative Example 3 | 11354 | 86.7 | 40874 | 93.9 | NG | NG | — | NG |
| Comparative Example 4-2 | 13271 | 86.4 | 47026 | 95.3 | NG | NG | — | — |

Referring to Table 2 above, it was confirmed that Examples 1, 2, 3-2 and 4 to 6, which included the free volume-increasing agents of Formulas 1 to 3 above, showed decreased initial pressures in both the room temperature region and the low-temperature region, and all satisfied a recovery of 89% or more. That is, it was confirmed that the folding performance was improved by improving both contrary physical properties (strain and recovery) in the room temperature region and the low-temperature region, and that, even after the dynamic folding test was performed, no bubbles, exfoliation, and hard coating layer cracking occurred, and no fold mark occurred in the folding portion (folding position).

In contrast, it was confirmed that Comparative Examples 1 to 3 and 4-2, which included no free volume-increasing agent, did not satisfy low initial pressures and high recoveries in the room temperature region and the low-temperature region. In addition, it was confirmed that Comparative Examples 3 and 4-2 did not satisfy the glass transition temperature, and thus did not satisfy the dynamic folding test at room temperature.

Therefore, according to the foldable adhesive film and the fabrication method therefor according to the present invention, the free volume-increasing agent is included, and thus it is possible to prevent the occurrence of a fold mark in the folding portion of the foldable adhesive film and improve the folding performance of the foldable adhesive film by increasing the creep strain of the foldable adhesive film and reducing the strain after recovery of the foldable adhesive film, at high temperature and room temperature, and reducing the initial pressure of the foldable adhesive film and increasing the recovery of the foldable adhesive film, at low temperature and room temperature.

The invention claimed is:

1. A foldable adhesive film comprising:
an adhesive layer comprising a cured product of an adhesive composition; and a substrate provided on one surface of the adhesive layer,
wherein the adhesive composition comprises: a copolymer of a mixture containing a (meth)acrylate containing at least one alkyl group having 2 to 10 carbon atoms, a (meth)acrylate containing a polar group, and a free volume-increasing agent; and a crosslinking agent, and
wherein the content of the crosslinking agent is 0.3 to 0.6 equivalent relative to the mixture and
wherein the cured product has a glass transition temperature of −80° C. to −20° C.

2. The foldable adhesive film of claim 1, wherein the free volume-increasing agent is one or more selected from among the following Formulae 1 to 3:

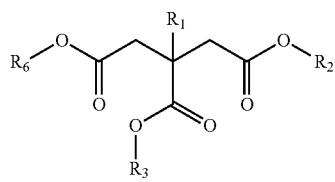
[Formula 1]

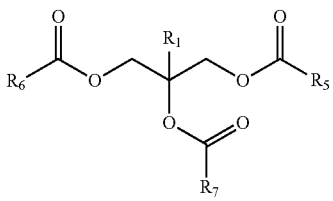
[Formula 2]

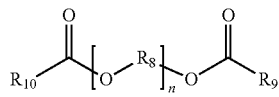
[Formula 3]

wherein
$R_1$ is a hydrogen atom, a hydroxyl group, or an ester group having 2 to 6 carbon atoms;
$R_2$, $R_3$, $R_4$, $R_5$, $R_6$, $R_7$, $R_9$ and $R_{10}$ are each independently a substituted or unsubstituted, linear or branched alkyl group having 1 to 10 carbon atoms;
R8 is an alkylene group having 1 to 4 carbon atoms; and
n is an integer ranging from 1 to 10.

3. The foldable adhesive film of claim 1, wherein the content of the (meth)acrylate containing the at least one alkyl group in the mixture is 80.0 wt % to 99.9 wt %.

4. The foldable adhesive film of claim 1, wherein the content of the (meth)acrylate containing the polar group in the mixture is 0.1 wt % to 20.0 wt %.

5. The foldable adhesive film of claim 1, wherein the content of the free volume-increasing agent is 5 parts by weight to 20 parts by weight based on 100 parts by weight of the mixture of the (meth)acrylate containing the at least one alkyl group and the (meth)acrylate containing the polar group.

6. The foldable adhesive film of claim 1, having:
a creep strain of at least 100% as measured by applying a pressure of 10,000 Pa for 600 seconds at 25° C.; and
a strain after recovery of 15% or less as measured 600 seconds after removal of the pressure.

7. The foldable adhesive film of claim 1, having:
a creep strain of at least 100% as measured by applying a pressure of 10,000 Pa for 600 seconds at 60° C.; and
a strain after recovery of 15% or less as measured 600 seconds after removal of the pressure.

8. The foldable adhesive film of claim 1, wherein
an initial pressure applied to the foldable adhesive film at 25° C. so as for the foldable adhesive film to have a strain of 12% is 10,000 Pa or less, and
the foldable adhesive film has a recovery of at least 85% as measured 600 seconds after removal of the initial pressure.

9. The foldable adhesive film of claim 1, wherein
an initial pressure applied to the foldable adhesive film at −20° C. so as for the foldable adhesive film to have a strain of 12% is 12,000 Pa or less, and
the foldable adhesive film has a recovery of at least 85% as measured 600 seconds after removal of the initial pressure.

* * * * *